United States Patent
Khawer et al.

(10) Patent No.: US 10,015,719 B2
(45) Date of Patent: Jul. 3, 2018

(54) DOWNLINK PACKET ROUTING IN A SYSTEM-ON-A-CHIP BASE STATION ARCHITECTURE

(71) Applicants: Alcatel-Lucent USA Inc., Murray Hill, NJ (US); Alcatel-Lucent, Boulogne-Billancourt (FR)

(72) Inventors: Mohammad R. Khawer, Lake Hopatcong, NJ (US); Mugur Abulius, Villejuif (FR)

(73) Assignees: Alcatel-Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 125 days.

(21) Appl. No.: 15/056,049

(22) Filed: Feb. 29, 2016

(65) Prior Publication Data
US 2017/0251419 A1    Aug. 31, 2017

(51) Int. Cl.
*H04W 40/04*   (2009.01)
*H04W 72/12*   (2009.01)
*G06F 13/42*   (2006.01)

(52) U.S. Cl.
CPC ........ *H04W 40/04* (2013.01); *G06F 13/4282* (2013.01); *H04W 72/1236* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 6,574,221 B1 * | 6/2003 | Petersen | H04L 49/3081 370/395.1 |
| 9,497,171 B2 | 11/2016 | Khosravi et al. | |
| 2006/0174032 A1 | 8/2006 | Winchester et al. | |
| 2008/0045226 A1 * | 2/2008 | Liu | H04L 5/0037 455/450 |
| 2010/0185818 A1 * | 7/2010 | Sheng | G06F 12/0802 711/130 |
| 2012/0182929 A1 * | 7/2012 | Chen | H04L 63/1458 370/315 |
| 2012/0264470 A1 * | 10/2012 | Bajj | H04W 88/08 455/509 |
| 2013/0279446 A1 * | 10/2013 | Lv | H04L 5/001 370/329 |
| 2014/0006908 A1 | 1/2014 | Gruber et al. | |
| 2014/0105067 A1 | 4/2014 | Chen et al. | |
| 2017/0249270 A1 | 8/2017 | Khawer et al. | |
| 2017/0250838 A1 | 8/2017 | Khawer et al. | |

OTHER PUBLICATIONS

Non-Final Office Action mailed Sep. 27, 2017 for U.S. Appl. No. 15/056,101, 15 pages.

* cited by examiner

*Primary Examiner* — Kodzovi Acolatse
(74) *Attorney, Agent, or Firm* — Davidson Sheehan LLP (57) ABSTRACT

A base station includes a plurality of system-on-a-chip (SOC) boards, which each include a plurality of SOC devices to support wireless communication on a plurality of carriers. One of the SOC devices is a transport SOC (TSOC) device that terminates a backhaul interface for receiving downlink radio bearer packets. Each of the SOC devices configures the TSOC device to route downlink radio bearer packets to a packet data convergence protocol (PDCP) module in the SOC device.

17 Claims, 5 Drawing Sheets

DOWNLINK PACKET ROUTING IN A SYSTEM-ON-A-CHIP BASE STATION ARCHITECTURE

BACKGROUND

Field of the Disclosure

The present disclosure relates generally to wireless communication systems and, more particularly, to routing downlink radio bearer packets in a wireless communication system.

Description of the Related Art

Conventional base stations (which may also be referred to as eNodeBs) typically implement two types of processor boards: a controller board and one or more modem boards. A conventional controller board includes a network processing unit (NPU) to terminate a backhaul connection to a core network of the wireless communication system and a second processor that implements a protocol stack for processing protocols such as the packet data convergence protocol (PDCP), the general packet radio service (GPRS) tunneling protocol (GTP), Internet protocol security (IPSec), and the like. No baseband processing is typically performed on the conventional controller board. Instead, the modem board performs baseband processing of signals received over the air interface or signals to be transmitted over the air interface. The modem board includes one or more digital signal processors (DSPs) to handle physical layer (or Layer 1) operations and a separate multi-core processor is used to perform higher layer (e.g., Layer 2 and Layer 3) operations. The controller board and the one or more modem boards each require additional dedicated devices such as read-only memory (ROM), random access memory (RAM) that may be implemented using double data rate (DDR) memory, or flash memory to store generic applications, an operating system image, and the like. Interfaces must also be provided between the controller board and the one or more modem boards. Each conventional modem board with a multi core processor and DSPs can support up to three carriers, so a base station with three modem boards can support up to nine carriers and approximately 2000 connected users.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A conventional controller board and one or more conventional modem boards can each be replaced with a system-on-a-chip (SOC) board that can utilize one or more SOC devices. Each software-defined SOC board can be programmed to function as either a pure modem board that performs baseband processing or as a combined controller/modem board that terminates the backhaul interface and performs modem baseband processing for one or more carriers that are supported by one or more SOC devices. For example, one of the SOC devices, which is referred to as a transport SOC (TSOC) device, may be programmed to terminate the backhaul interface. The TSOC device also supports up to three carriers and resides on an SOC board that hosts two additional SOC devices. The remainder of the SOC boards are programmed to support three SOC devices, which provide baseband processing for up to three carriers per SOC device. Thus, a base station that implements four SOC boards may support a total of up to 36 cellular carriers (an increase by a factor of four over the conventional eNodeB architecture) and may be capable of hosting up to approximately 40,000 active users (a factor of twenty increase in capacity over the conventional eNodeB architecture).

Consolidating the functionality of the controller board and the modem boards onto SOC boards reduces the overall device count and the cost of goods sold (COGS) for each base station, as well as also potentially reducing the size, thermal dissipation, and packaging of the base station. Each SOC device is replacing several separate processing devices such as one or more NPUs, a second processor for the controller board, one or more multi-core processors for modem baseband processing, and one or more DSPs for modem Layer 1 processing. Each of the conventional devices that is replaced by the SOC devices requires their own dedicated ROM, RAM, and flash memories for proper operation and initialization. Instead of using several separate ROM, RAM, and flash memory elements, each SOC device on the SOC board uses a single larger size ROM, RAM, and flash memory. Replacing the conventional devices with SOC devices therefore reduces the number of supporting devices on an SOC board by a factor of approximately four.

A centralized PDCP, such as the PDCP implemented on a conventional controller board, cannot be scaled to support such a large number of users and would become a bottleneck for downlink radio bearer packets, as well as a single point of failure for the base station. A distributed packet data convergence protocol (PDCP) processing mechanism is therefore used to avoid the bottleneck and provide efficient routing of downlink radio bearer packets. A plurality of distributed PDCP modules are hosted by the plurality of SOC devices. A managing entity such as a transport abstraction layer (TAL) can configure hardware acceleration engines in the corresponding SOC boards to route downlink radio bearer packets from a backhaul interface to the distributed PDCP modules on the plurality of SOC devices in a base station. Processor cores on the SOC devices are not involved in routing the downlink radio bearer packets once the downlink radio bearer paths have been configured into the hardware acceleration engines on the SOC devices. For example, a configured hardware acceleration engine on a TSOC device can receive incoming downlink radio bearer packets from the backhaul interface and route the downlink radio bearer packets from the TSOC device to the appropriate distributed PDCP module, which may reside on any of the twelve SOC devices on the four SOC boards including the TSOC. The downlink radio bearer path bypasses the processor cores implemented by the SOC devices to ensure that the scarce processing core resources are not utilized for this task so that the base-station is capable of supporting a large number of simultaneously or concurrently connected users.

Some embodiments of the hardware acceleration engine in the TSOC route the downlink radio bearer packets based on identifiers included in the packets. For example, SOC identifiers include an identifier number that indicates an SOC device, information indicating the corresponding SOC board that implements the SOC device, and a shelf number that identifies a shelf in the base station that hosts the SOC board. A TSOC device may therefore receive a downlink packet over the backhaul and use the SOC identifier to determine the shelf, board, and number of the SOC device that supports the downlink radio bearer that is used to transmit the downlink packet over the air interface. The downlink packet may then be routed by the hardware acceleration engines on the TSOC device to the distributed PDCP module running on the processing core of the SOC device identified by the SOC identifier. In some embodiments, the SOC identifier is transmitted to a network entity, such as a mobility management entity (MME), during or in response to booting up the SOC board. The MME can then attach the SOC identifiers to the corresponding downlink radio bearer packets before transmitting them over the backhaul. Transport abstraction layers (TALs) in the SOC devices may program the hardware acceleration engine on the TSOC to define rules for packet parsing, classification, and dispatching (PCD) of downlink radio bearer packets to the corresponding SOC devices via downlink radio bearer paths. The PCD rules for an SOC device may be removed if the SOC device is uninstalled or prior to rebooting the SOC device.

Figure 1:
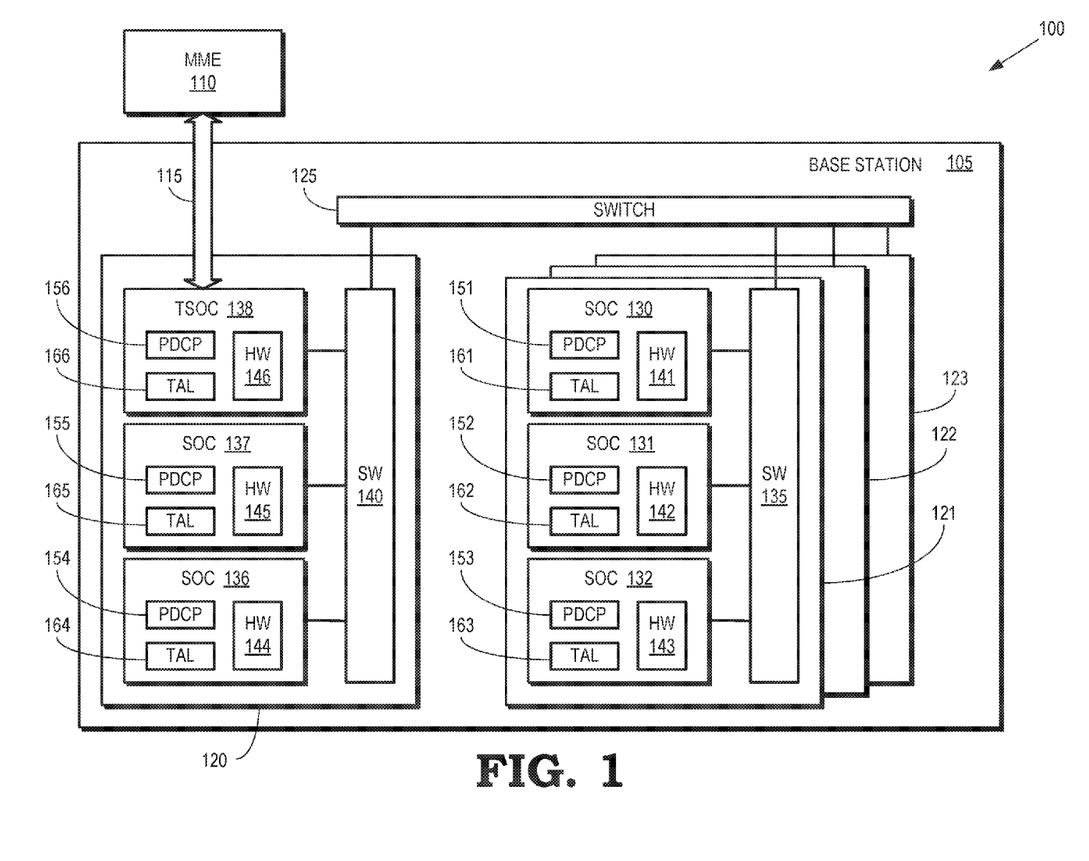
FIG. 1 is a block diagram of a wireless communication system according to some embodiments.

FIG. 1 is a block diagram of a wireless communication system 100 according to some embodiments. The wireless communication system 100 includes a base station 105 that can support wireless communication over an air interface with one or more user equipment. The base station 105 is connected to a mobility management entity (MME) 110, as well as other entities in the core network, via a backhaul interface 115, which may be implemented using cables, optical fibers, wireless links, and the like. The backhaul interface 115 conveys signaling such as downlink radio bearer packets for transmission over the air interface by the base station 105 and uplink packets received by the base station 105 over the air interface. For example, the MME 110 may support a stream control transmission protocol (SCTP) to support datagram delivery according to the Internet Protocol (IP) and an S1 application part (S1AP) protocol for managing radio bearers, performing context transfers, mobility functions, paging, and the like. Other signaling such as configuration information may also be exchanged between the base station 105 and the MME 110 over the backhaul interface 115.

The base station 105 includes a plurality of boards 120, 121, 122, 123 that are referred to herein as system-on-a-chip (SOC) boards 120-123. The SOC boards 120-123 are interconnected by a switch 125, which is an Ethernet switch in some embodiments. Each of the SOC boards 120-123 includes a plurality of SOC devices that are configured to support one or more carriers for wireless communication over the air interface. For example, the SOC board 121 includes the SOC devices 130, 131, 132, which are referred to collectively as "the SOC devices 130-132." Each of the SOC devices 130-132 supports up to three independent carriers. Some embodiments of the base station 105 may include more or fewer SOC boards and each SOC board may include more or fewer SOC devices that support more or fewer carriers. A switch 135, which is an Ethernet switch in some embodiments, interconnects the SOC devices 130-132. The SOC board 120 includes the SOC devices 136, 137 and a transport SOC (TSOC) device 138, which is an SOC device that has been configured to terminate the backhaul interface 115. Thus, uplink and downlink radio bearer packets that are conveyed over the backhaul interface 115 pass through the TSOC device 138, as discussed herein. The TSOC device 138 may also support up to three carriers for wireless communication. The SOC board 120 also includes a switch 140, which is an Ethernet switch in some embodiments. The SOC boards 121, 122, 123 also include SOC devices and an interconnecting switch, but these entities are not shown in FIG. 1 in the interest of clarity.

The SOC devices 130-132, 136-138 implement hardware (HW) acceleration engines 141, 142, 143, 144, 145, 146, which are referred to collectively as "the hardware acceleration engines 141-146." Some embodiments of the hardware acceleration engines 141-146 implement a security engine, a buffer manager, a frame manager, and a queue manager, as well as corresponding hardware queues and buffers, as discussed herein. The SOC devices 130-132, 136-138 also implement packet data convergence protocol (PDCP) modules 151, 152, 153, 154, 155, 156 (referred to collectively as "the PDCP modules 151-156") and transport abstraction layers (TALs) 161, 162, 163, 164, 165, 166 (referred to collectively as "the TALs 161-166"). The PDCP modules 151-156 and the TALs 161-166 are implemented using a plurality of processor cores in the corresponding SOC devices 130-132, 136-138.

The SOC devices 130-132, 136-138 can configure the TSOC device 138 to route downlink radio bearer packets to the PDCP modules 151-156 in the corresponding SOC devices 130-132, 136-138. For example, when the SOC device 130 is initialized, powers on, or boots up, the TAL 161 may send parsing, classification, and dispatching (PCD) rules that program the hardware acceleration engine 146 on the TSOC 138 to route downlink radio bearer packets to the PDCP 151 along a downlink radio bearer path that bypasses processor cores in the TSOC 138. Similar programming of the hardware acceleration engine 146 may be performed by the other TALs 162-166. The hardware acceleration engine 146 may route the downlink radio bearer packets on the basis of identifiers included in the packets, e.g., identifiers attached to the downlink radio bearer packets by the MME 110. Some embodiments of the identifiers include a number of one of the SOC devices 130-132, 136-138, information indicating one of the SOC boards 120-123, a shelf number that identifies a shelf in the base station 105 that hosts the SOC board, information indicating an instance of one of the PDCP modules 151-156, an incarnation bit that is flipped in response to termination of a previous instance of one of the PDCP modules 151-156, and information indicating a quality-of-service (QoS) field to hold a value that indicates a QoS class identifier (QCI) associated with the downlink packet.

Figure 2:
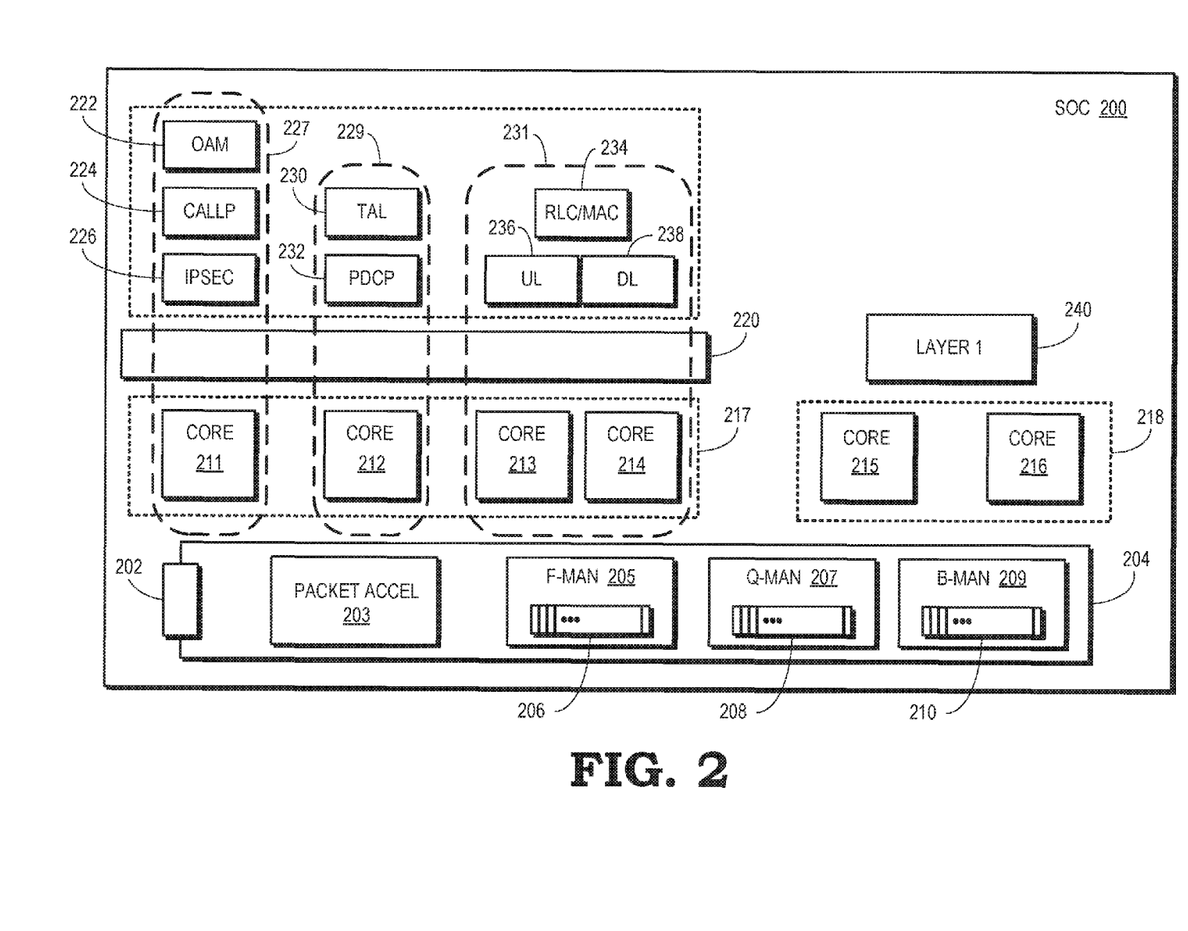
FIG. 2 is a block diagram of a system-on-a-chip (SOC) device according to some embodiments.

FIG. 2 is a block diagram of an SOC device 200 according to some embodiments. The SOC device 200 may be used to implement some embodiments of the SOC devices 130-132, 136-138 shown in FIG. 1. The SOC device 200 includes a hardware acceleration engine 204 that can be interconnected to other devices using the interface 202, which may be an Ethernet interface for connecting the SOC device 200 to an Ethernet switch or other devices. The hardware acceleration engine 204 includes a packet accelerator 203 that performs encryption or decryption of packets, e.g., according to the IPSec protocols. The hardware acceleration engine 204 also includes a frame manager (F-MAN) 205 for receiving and parsing packets, e.g., according to PCD rules configured on the hardware acceleration engine 204. The frame manager 205 has a corresponding hardware queue 206 that is used to queue packets that are to be provided to other entities in the SOC device 200. The hardware acceleration engine 204 further includes a queue manager (Q-MAN) 207 that is used to manage additional hardware queues 208, as discussed herein. The hardware acceleration engine 204 further includes a buffer manager (B-MAN) 209 that is used to perform buffering of packets using one or more buffers 210.

The SOC device 200 also includes a plurality of processor cores 211, 212, 213, 214, 215, 216, which are referred to herein as "the processor cores 211-216." In the illustrated embodiment, the processor cores 211-214 are implemented using a first type of processor such as PowerPC® cores 217 and the processor cores 215, 216 are implemented using a second type of processor such as a digital signal processor 218. The processor cores 211-214 utilize a real time operating system (RTOS) 220, such as a symmetric multiprocessor (SMP) RTOS in a single partition configuration. To achieve maximum system scalability a single partition consisting of all the processing cores 211-214 may be defined that is served by the single RTOS instance 220.

Some embodiments of the SOC device 200 utilize core reservation and core affinity techniques to bond different types of threads and processes to different processor cores 211-216 to achieve logical partitioning 227, 229, 231 of real time, and non-real time processing on different cores within the single SMP partition 220 that contains the processing cores 211-214. For example, non-real-time threads and processes produced by an operations, administration, and management (OAM) module 222, a CallP module 224 for paging user equipment, an IPSec module 226 for handling security, and other Layer 3 or higher layer modules may be bound to the processor core 211, as indicated by the dashed oval 227. Link layer (or Layer 2) modules that operate in real-time such as the TAL 230 and the PDCP 232 for the SOC device 200 may be bound to the processor core 212, as indicated by the dashed oval 229. Other real-time operations that provide backhaul support may also be bound to the processor core 212. Other Layer 2 modules that perform packet scheduling in real-time such as the radio link control (RLC)/media access control (MAC) module 234, the uplink (UL) scheduler 236, and the downlink (DL) scheduler 238 may be bound to the processor cores 213, 214, as indicated by the dashed oval 231. Physical layer (or Layer 1) functionality 240 may be bound to the processor (DSP) cores 215, 216.

As discussed herein, the hardware acceleration engine 204 can be configured to route packets on the basis of identifiers included in the packets. If the SOC device 200 is configured to operate as a TSOC device such as the TSOC device 138 shown in FIG. 1, the hardware acceleration engine 204 can receive configuration information from the TAL 230 or (via the interface 202) from other TALs on other SOC devices, which may be on the same board as the TSOC device 200 or on a different board. The configuration information may allow the TAL 230 to employ the appropriate PCD rules that the hardware acceleration engine 204 uses to route packets to the appropriate PDCP module along a downlink radio bearer path that bypasses the processor cores 211-216. For example, the hardware acceleration engine 204 may queue an incoming packet in one of the hardware queues 206, 208 that are used to hold packets before transmitting them to the PDCP module indicated by the identifying information in the packet via the interface 202. The target PDCP module can include the PDCP module 232 or another PDCP module on another SOC device. If the SOC device 200 is not configured to operate as a TSOC device, the TAL 230 may send configuration information to the TAL on the TSOC device so that it may configure the hardware acceleration engine on the TSOC device in the base station that includes the SOC device 200 and setup the downlink radio bearer path from the external Ethernet interface 202 to the remote SOC device where the distributed PDCP module resides.

Figure 3:
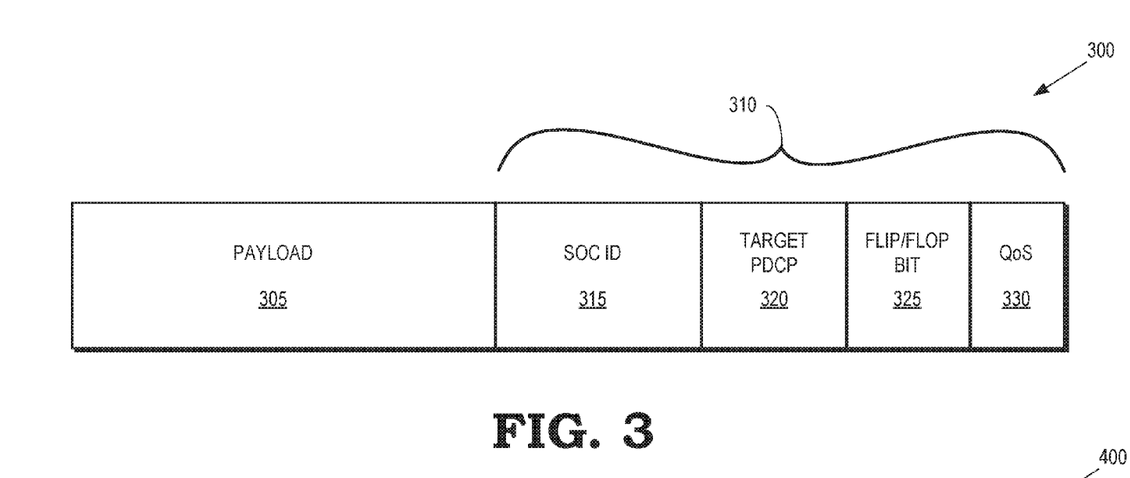
FIG. 3 is a block diagram of a downlink packet according to some embodiments.

FIG. 3 is a block diagram of a downlink packet 300 according to some embodiments. The downlink packet 300 may be transmitted from an MME (such as the MME 110 shown in FIG. 1) to a TSOC device at a base station (such as the TSOC device 138 in the base station 105 shown in FIG. 1). The base station may then transmit the downlink packet 300 or a modified version of the downlink packet 300 over an air interface. The downlink packet 300 includes a payload 305 and a header 310. The payload 305 is used to carry data that is to be conveyed over the air interface to one or more user equipment. The header 310 includes information that identifies the recipient distributed PDCP module on a target SOC device that may include the TSOC device or other SOC devices, such as the SOC devices 130-132, 136, 137 shown in FIG. 1. Some embodiments of the header 310 may also include other information not depicted in FIG. 3.

In some embodiments, the information identifying the target SOC device includes a General Packet Radio Service (GPRS) tunnel endpoint identifier (TEID) included in a corresponding field of a GPRS tunneling protocol (GTP) header 310 for the downlink radio bearer GTP packets. The TEID may be defined by a local call processing module (CallP) such as the CallP 224 shown in FIG. 2 and then transmitted to the MME so that the MME can populate the field in the header 310 of the downlink packet 300 with the TEID that indicates the target SOC device. The target SOC device may be the TSOC device if the downlink radio bearer of the packet 300 uses one of the carriers supported by the TSOC device. Thus, routing the packet 300 may include routing the packet 300 locally (i.e., to a PDCP module within the TSOC device) or to the PDCP modules in other SOC devices. The TALs in the TSOC device and the other SOC devices within a base station can program the hardware acceleration engine with the appropriate PCD rules in the TSOC device to route downlink radio bearer packets to the PDCP modules on the TSOC/SOC devices based on the information included in the TEID.

Some embodiments of the TEID include fields that are used by the hardware acceleration engine in the TSOC device to route the packet 300 to the target SOC device. For example, the header 310 may include an SOC identifier 315 of the target SOC device that hosts the PDCP module that handles the downlink radio bearer conveying the packet 300. The SOC identifier 315 includes one or more identifier numbers that indicate the target SOC device, information indicating an SOC board that hosts the target SOC device, or a shelf number that identifies a shelf in a base station that hosts the SOC board. The header 310 also includes a field 320 that indicates the target PDCP module on the target SOC device. The header 310 also includes an incarnation flip-flop bit 325 that is flipped each time a new instance of the PDCP module is created. For example, the incarnation flip-flop bit 325 may be set to 1 when a first PDCP module is instantiated on the target SOC device. However, if the target SOC device is rebooted and a new (second) PDCP module is created to replace the first PDCP module, the incarnation flip-flop bit 325 is flipped to 0. Thus, the packet 300 is not routed to the second PDCP module if it was originally addressed to the first PDCP module prior to reboot of the target SOC device because the value of the incarnation flip-flop bit 325 in the header 310 does not match the value of the incarnation flip-flop bit associated with the second PDCP module. The header 310 further includes a quality-of-service (QoS) field 330 that indicates a QoS associated with the packet 300. For example, the QoS field 330 may include three bits that are used to indicate a QoS class identifier (QCI) value associated with the downlink radio bearer that conveys the packet 300.

Figure 4:
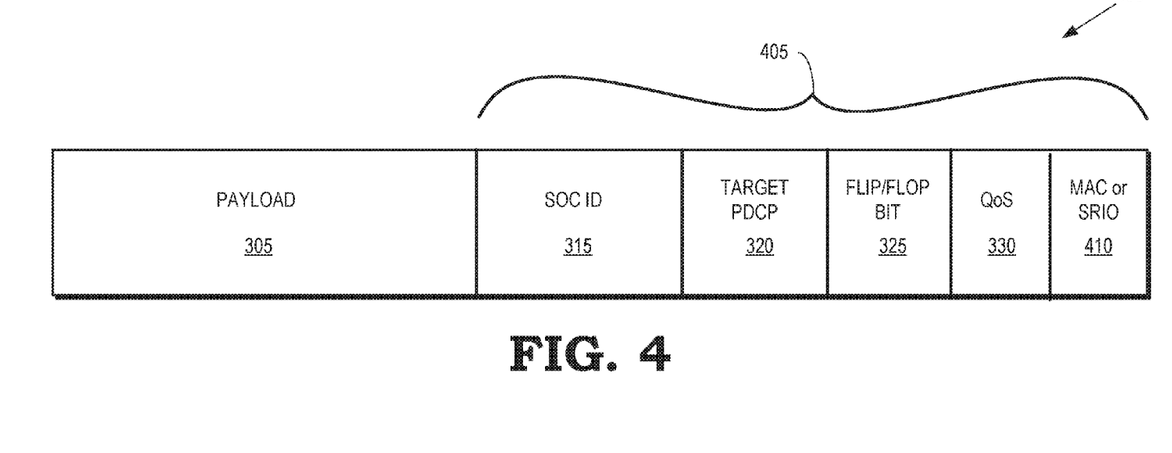
FIG. 4 is a block diagram of a downlink packet that is configured for transmission from a hardware acceleration engine in a transport SOC (TSOC) device to a packet data convergence protocol (PDCP) module in an SOC device according to some embodiments.

FIG. 4 is a block diagram of a downlink packet 400 that is configured for transmission from a hardware acceleration engine in a TSOC device to a PDCP module in an SOC device according to some embodiments. The downlink packet 400 corresponds to the downlink packet 300 that may be received by the hardware acceleration engine in the TSOC device. Thus, the downlink packet 400 includes the payload 305, the SOC identifier 315, the target PDCP 320, the incarnation flip-flop bit 325, and the QoS information 330 that were conveyed in the downlink packet 300. The header 405 of the downlink packet 400 differs from the downlink packet 300 because the header 405 includes an additional address field 410 that includes a value that addresses the downlink packet 400 to the target SOC device. For example, if the backplane interface that interconnects the SOC boards in the base station implements Ethernet switches, the hardware acceleration engine in the TSOC device updates the value of the address field 410 to include a MAC address associated with the target SOC device and then transmits the packet 400 over the backplane interface. For another example, if the backplane interface implements a RapidI/O interface, the hardware acceleration engine in the TSOC device updates the value of the address field 410 to include an sRIO address associated with the target SOC device. The hardware acceleration engine then queues the packet 400 in a hardware queue attached to the sRIO, such as one of the frame queues 206 shown in FIG. 2. One frame queue may be associated with each internal (Ethernet or SRIO) interface that has an attached target SOC device and the hardware acceleration engine may be configured to send packets in the frame queues to the corresponding internal interface towards the target SOC device.

Figure 5:
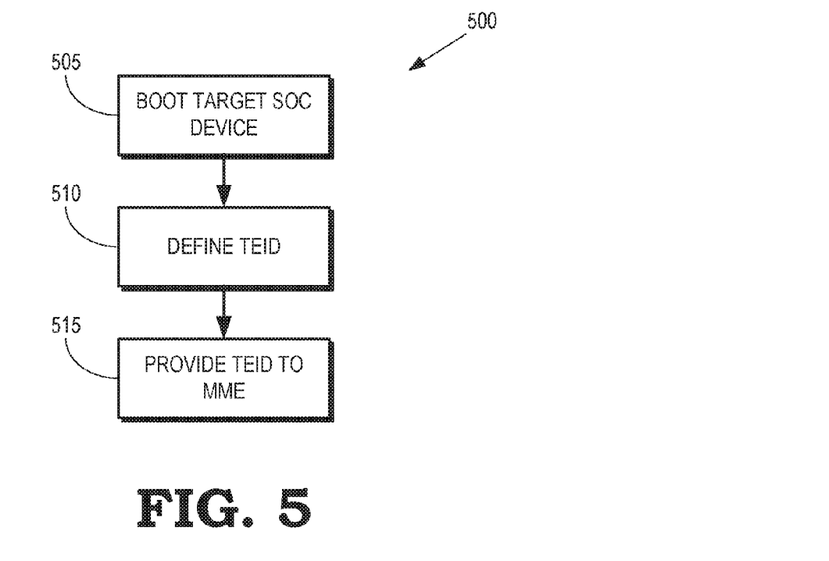
FIG. 5 is a flow diagram of a method of configuring identifiers of a distributed PDCP module hosted on a target SOC devices according to some embodiments.

FIG. 5 is a flow diagram of a method 500 of configuring identifiers of a distributed PDCP module hosted on a target SOC devices according to some embodiments. The method 500 may be implemented in some embodiments of the SOC devices 130-132, 136-138 shown in FIG. 1 or the TAL 230 shown in FIG. 2. At block 505, the target SOC device is booted or otherwise initialized. For example, the target SOC device may be booted in response to installing the target SOC device on an SOC board or in response to powering up the target SOC device. At block 510, a TAL is instantiated on the target SOC device and the TAL defines an identifier such as a TEID that identifies the target SOC device, as well as the PDCP module hosted by the target SOC device. Examples of the fields of the TEID that may be defined by the TAL are discussed herein, e.g., with regard to FIG. 3. At block 515, the TAL transmits the TEID over a backhaul interface to a network entity such as the MME 110 shown in FIG. 1. The MME may then use the TEID to populate the fields in the headers of packets that are destined for the target SOC device.

Figure 6:
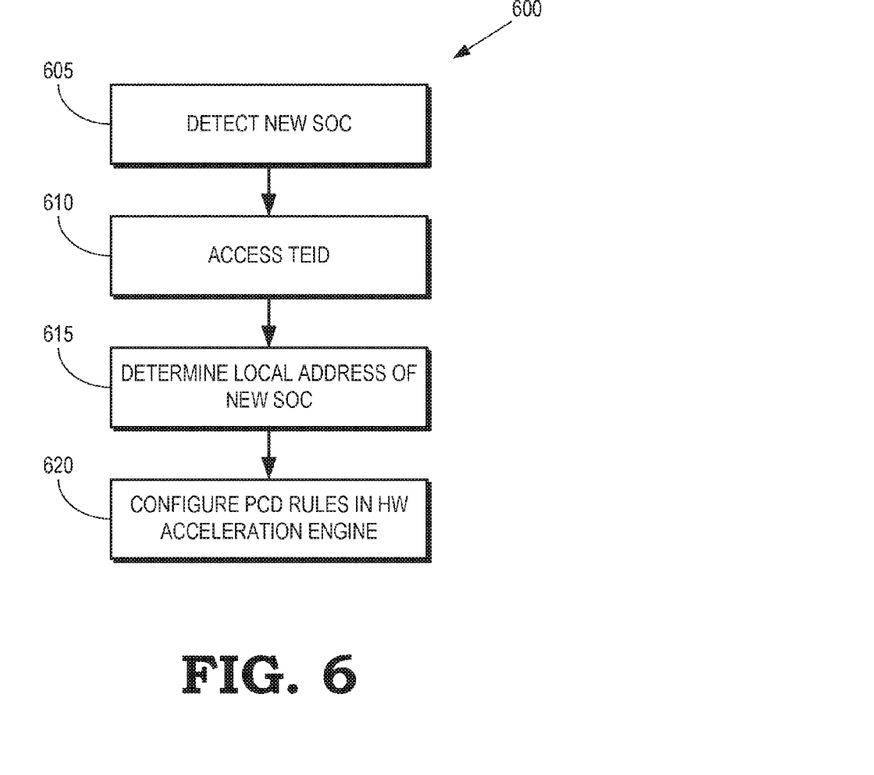
FIG. 6 is a flow diagram of a method of configuring a hardware acceleration engine in a TSOC device according to some embodiments.

FIG. 6 is a flow diagram of a method 600 of configuring a hardware acceleration engine in a TSOC device according to some embodiments. The method 600 may be implemented in some embodiments of the TSOC device 138 shown in FIG. 1 or the TAL 230 shown in FIG. 2. The TSOC device can determine when another SOC device appears (e.g., after starting up the SOC device) in the base station or when an existing SOC device disappears (e.g., due to powering down the SOC device). For example, the SOC devices (including the TSOC device) may implement a publication/subscription service that allows the different SOC devices to signal their presence and establish communication with the TSOC device. When a SOC device is fully initialized, its TAL not only registers itself with the TAL on TSOC to setup the appropriate PCD rules for routing packets on the TSOC, but it also configures local PCD rules on the SOC device to ensure that when a packet arrives on the local interface to the SOC device, the packet is queued on the correct hardware queue for delivery to the distributed PDCP module on the SOC device. The local PCD rules on the SOC device may also be configured to support a QOS scheme by routing incoming packets to the correct priority queues based on the QOS information contained in the packet header.

At block 605, the TSOC device detects the presence of a new SOC device. For example, the TAL on the TSOC device may detect the presence of the new SOC device using the publication/subscription service. At block 610, the TSOC device accesses information indicating the TEID of the new SOC device. For example, the new SOC device may transmit the TEID in a notification message that is transmitted as part of the publication/subscription service. At block 615, the TAL in the TSOC device determines a local address of the new SOC device. The local address may be a MAC address if the base station implements an Ethernet backplane or the local address may be an sRIO address if the base station implements RapidI/O. At block 620, the TAL in the TSOC device generates PCD rules and configures the hardware acceleration engine in the TSOC to route incoming packets to the new SOC device on the basis of the PCD rules and header information in the incoming packets. The TAL in the TSOC may also remove the PCD rules from the hardware acceleration engine in response to an SOC device disappearing from the base station.

Figure 7:
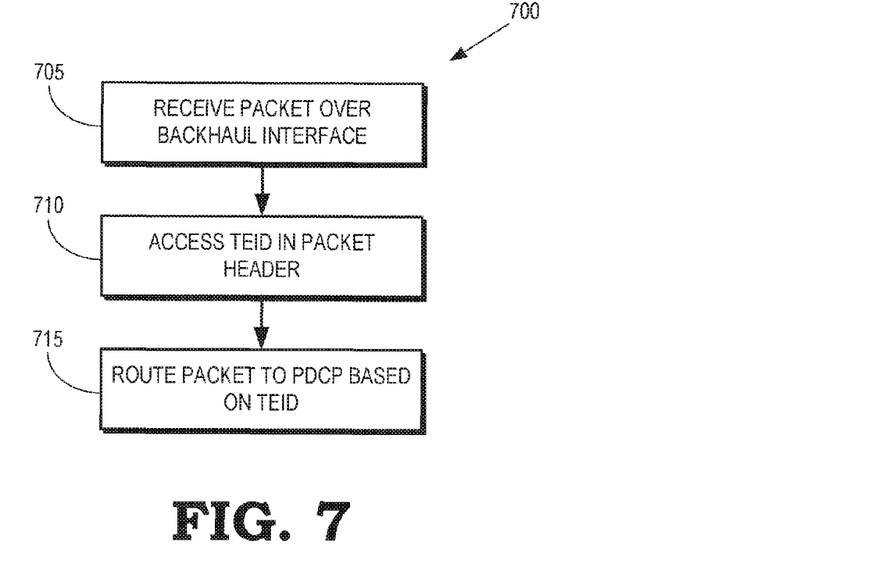
FIG. 7 is a flow diagram of a method of routing packets using a hardware acceleration engine in a TSOC device according to some embodiments.

FIG. 7 is a flow diagram of a method 700 of routing packets using a hardware acceleration engine in a TSOC device according to some embodiments. The method 700 may be implemented in some embodiments of the TSOC device 138 shown in FIG. 1 or the hardware acceleration engine 204 shown in FIG. 2. The hardware acceleration engine has been programmed to route packets to a target SOC device based on header information in the packet and PCD rules programmed into the hardware acceleration engine, e.g., according to the method 600 shown in FIG. 6.

At block 705, the hardware acceleration engine receives the downlink packet over a backhaul interface. Some embodiments of the hardware acceleration engine perform operations such as decryption according to IPSec, packet reassembly, and the like. At block 710, the hardware acceleration engine accesses a TEID in the packet header. As discussed herein, the TEID includes an SOC identifier that indicates the target SOC device. At block 715, the hardware acceleration engine routes the packet to a PDCP module in the target SOC device based on the TEID. Routing the packet includes generating a local address of the target SOC device. For example, if the backplane interface that interconnects the SOC boards in the base station implements Ethernet switches, the hardware acceleration engine updates the packet header to include a MAC address associated with the target SOC device and then transmits the packet over the backplane interface. For another example, if the backplane interface implements a RapidI/O interface, the hardware acceleration engine updates the packet header to include an sRIO address associated with the target SOC device. The hardware acceleration engine then sends the packet to a hardware queue attached to the sRIO, such as one of the frame queues 206 shown in FIG. 2. Since the hardware acceleration engine performs routing of the downlink radio bearer packets without involving processor cores in the TSOC device, the downlink radio bearer path from the TSOC device to the PDCP module in the remote SOC device bypasses these processor cores.

Figure 8:
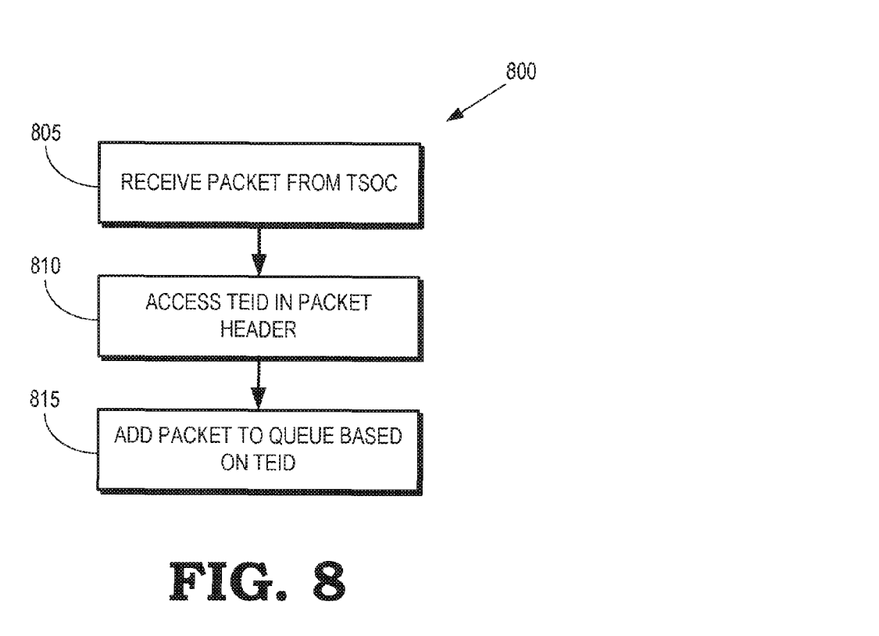
FIG. 8 is a flow diagram of a method of queuing packets received by a remote SOC device that hosts a target PDCP module according to some embodiments.

FIG. 8 is a flow diagram of a method 800 of queuing packets received by a remote SOC device that hosts a target PDCP module according to some embodiments. The method 800 may be implemented in some embodiments of the TSOC device 138 shown in FIG. 1 or the hardware acceleration engine 204 shown in FIG. 2. At block 805, the hardware acceleration engine of the remote SOC device receives a downlink packet routed from the hardware acceleration engine on the TSOC device over a downlink radio bearer path that bypasses processor cores on the TSOC device. At block 810, the configured PCD rules at the hardware acceleration engine of the remote SOC are used to access the TEID in the packet header to determine the QoS associated with the radio bearer that conveyed the downlink packet. At block 815, the configured PCD rules at the hardware acceleration engine at the remote SOC are used to queue the downlink radio bearer packet to one of a plurality of queues indicated by the value of the QoS field in the packet header. For example, a hardware acceleration engine in the target SOC device may implement eight priority queues associated with corresponding QCI values. The downlink packet may then be queued in one of the eight priority queues that is indicated by a QCI value in the QoS field in the packet header. The downlink packet may then be processed and delivered to the PDCP module for transmission over the air interface based on the priority indicated by the priority queue. Some embodiments of the priority queues may be implemented using the queues 206, 208 shown in FIG. 2.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a plurality of system-on-a-chip (SOC) boards, each SOC board comprising a plurality of SOC devices to support wireless communication on a plurality of carriers, wherein one of the SOC devices is a transport SOC (TSOC) device that terminates a backhaul interface for receiving downlink radio bearer packets, and wherein each of the SOC devices configures the TSOC device to route downlink radio bearer packets to a packet data convergence protocol (PDCP) module in the SOC device, wherein each of the plurality of SOC devices comprises:

a hardware acceleration engine; and a plurality of processor cores, wherein non-real-time processes are bound to a first portion of the processor cores, real-time backhaul support and the PDCP module are bound to a second portion of the processor cores, real-time scheduling is bound to a third portion of the processor cores, and physical layer processing is bound to a fourth portion of the processor cores.

2. The apparatus of claim 1, wherein the SOC devices implement transport abstraction layer (TALs) to configure the hardware acceleration engine in the TSOC device to route the downlink radio bearer packets to the corresponding PDCP modules on downlink radio bearer paths that bypass the plurality of processor cores.

3. The apparatus of claim 2, wherein the TALs in the SOC devices program the hardware acceleration engine in the TSOC to define rules for parsing, classification, and dispatching (PCD) of downlink radio bearer packets to the SOC devices on the downlink radio bearer paths.

4. The apparatus of claim 3, wherein the PCD rules for an SOC device are removed from the hardware acceleration engine in response to the SOC device being uninstalled or prior to rebooting the SOC device.

5. The apparatus of claim 2, wherein the hardware acceleration engine in the TSOC device is to route the downlink radio bearer packets to the PDCP modules based on identifiers included in the downlink radio bearer packets.

6. The apparatus of claim 5, wherein the identifiers include at least one of an identifier number that indicates the SOC device, information indicating one of the plurality of SOC boards that hosts the SOC device, or a shelf number that identifies a shelf in a base station that hosts the SOC board.

7. The apparatus of claim 6, wherein the identifiers include information indicating an instance of the PDCP module on the SOC device and an incarnation bit that is flipped in response to termination of a previous instance of the PDCP module.

8. The apparatus of claim 6, wherein the identifiers include information indicating a quality-of-service (QoS) field to hold a value that indicates a QoS class identifier (QCI) associated with the downlink packet.

9. The apparatus of claim 6, wherein the identifiers are generated in response to booting the corresponding SOC device, and wherein the generated identifiers are transmitted to a mobility management entity (MME) that is configured to attach the identifiers to downlink radio bearer packets destined for the corresponding SOC device.

10. A method comprising:
receiving, via a backhaul interface at a transport system-on-a-chip (TSOC) device that is one of a plurality of SOC devices implemented on a plurality of SOC boards, a downlink packet addressed to an indicated SOC device of the plurality of SOC devices, wherein the downlink packet is to be transmitted using one of a plurality of carriers supported by the indicated SOC device;
routing, at the TSOC, the downlink packet to a packet data convergence protocol (PDCP) module implemented by the indicated SOC device; and
configuring a hardware acceleration engine in the TSOC device to route the downlink packet to the corresponding PDCP modules on downlink radio bearer paths that bypass a plurality of processor cores in the TSOC device.

11. The method of claim 10, wherein routing the downlink packet to the PDCP module comprises routing the downlink packet on the downlink radio bearer path that bypasses the plurality of processor cores in the TSOC device.

12. The method of claim 10, wherein configuring the hardware acceleration engine comprises programming the hardware acceleration engine in the TSOC to define rules for parsing, classification, and dispatching (PCD) of downlink radio bearer packets to the SOC devices on the downlink radio bearer paths.

13. The method of claim 12, wherein configuring the hardware acceleration engine comprises removing the PCD rules from the hardware acceleration engine in response to the SOC device being uninstalled or prior to rebooting the SOC device.

14. The method of claim 10, wherein routing the downlink radio bearer packets to the PDCP modules comprises routing the downlink radio bearer packets to the PDCP modules based on identifiers included in the downlink radio bearer packets.

15. The method of claim 14, wherein the identifiers include at least one of an identifier number that indicates the SOC device, information indicating one of the plurality of SOC boards that hosts the SOC device, a shelf number that identifies a shelf in a base station that hosts the SOC board, information indicating an instance of the PDCP module on the SOC device, an incarnation bit that is flipped in response to termination of a previous instance of the PDCP module, and information indicating a quality-of-service (QoS) field to hold a value that indicates a QoS class identifier (QCI) associated with the downlink packet.

16. The method of claim 14, further comprising:
generating the identifiers in response to booting the corresponding SOC device; and
transmitting the identifiers to a mobility management entity (MME) that is configured to attach the identifiers to downlink radio bearer packets destined for the corresponding SOC device.

17. A system-on-a-chip (SOC) board comprising:
a plurality of SOC devices that includes a transport SOC (TSOC) to terminate a backhaul interface for receiving downlink radio bearer packets, wherein each of the plurality of SOC devices supports wireless communication on at least one carrier, and wherein each of the plurality of SOC devices configures the TSOC to route downlink radio bearer packets received on the backhaul interface to a packet data convergence protocol (PDCP) module for transmission via the at least one carrier, wherein the plurality of SOC devices implement transport abstraction layer (TALs) to configure a hardware acceleration engine in the TSOC device to route the downlink radio bearer packets to the corresponding PDCP modules on downlink radio bearer paths that bypass a plurality of processor cores implemented in the plurality of SOC devices.

* * * * *